(12) United States Patent
Sourani (10) Patent No.: US 9,942,531 B2
(45) Date of Patent: Apr. 10, 2018

(54) DEVICE AND METHOD FOR AUTOMATIC COLOR CALIBRATION IN A LASER SCANNING APPARATUS

(71) Applicant: STMicroelectronics Ltd, Netanya (IL)

(72) Inventor: Sason Sourani, Hod Hasharon (IL)

(73) Assignee: STMicroelectronics LTd, Netanya (IL)

( * ) Notice: Subject to any disclaimer, the term of this patent is extended or adjusted under 35 U.S.C. 154(b) by 0 days.

(21) Appl. No.: 15/458,192

(22) Filed: Mar. 14, 2017

(65) Prior Publication Data

US 2017/0318271 A1    Nov. 2, 2017

(30) Foreign Application Priority Data

Apr. 29, 2016    (IT) .................... 102016000044101

(51) Int. Cl.
    *H04N 9/68*    (2006.01)
    *H04N 9/31*    (2006.01)
    *G02B 27/14*    (2006.01)

(52) U.S. Cl.
    CPC ......... *H04N 9/3194* (2013.01); *G02B 27/141* (2013.01); *H04N 9/3129* (2013.01); *H04N 9/3158* (2013.01); *H04N 9/3161* (2013.01); *H04N 9/3182* (2013.01)

(58) Field of Classification Search
    CPC .. H04N 9/3194; H04N 9/3129; H04N 9/3158; H04N 9/3161; H04N 9/3182; G02B 27/141
    USPC ........................................ 348/647
    See application file for complete search history.

(56) References Cited

U.S. PATENT DOCUMENTS

| | | | | |
|---|---|---|---|---|
| 4,684,996 | A * | 8/1987 | Baumeister | H04N 3/233 348/747 |
| 8,605,764 | B1 * | 12/2013 | Rothaar | G02B 27/01 372/29.01 |
| 2009/0161707 | A1 | 6/2009 | Champion et al. | |
| 2011/0205498 | A1 * | 8/2011 | Brown | G09G 3/02 353/31 |

FOREIGN PATENT DOCUMENTS

| | | |
|---|---|---|
| DE | 102010031217 A1 | 1/2012 |
| EP | 2741500 A1 | 6/2014 |

OTHER PUBLICATIONS

IT Search Report and Written Opinion for IT Appl. No. 102016000044101 dated Nov. 11, 2016 (8 pages).

* cited by examiner

*Primary Examiner* — Michael Lee
(74) *Attorney, Agent, or Firm* — Gardere Wynne Sewell LLP (57) ABSTRACT

A color calibration device for a laser scanning apparatus includes a compensation unit configured to electronically compensate for positional errors of the three-color laser source. The compensation unit includes an emitted light detector configured to measure a power of an emitted light beam. A calibration unit coupled to the emitted light detector has a controller configured to generate a quantity correction value for the three-color laser source. A laser source control element is configured to generate a control quantity for the three-color laser source, based on the quantity correction value. A dominant color detector is configured to detect any dominant color in the light beam being projected and actuate the controller for the dominant color.

20 Claims, 5 Drawing Sheets

DEVICE AND METHOD FOR AUTOMATIC COLOR CALIBRATION IN A LASER SCANNING APPARATUS

PRIORITY CLAIM

This application claims priority from Italian Application for Patent No. 102016000044101 filed Apr. 29, 2016, the disclosure of which is incorporated by reference.

TECHNICAL FIELD

This disclosure relates to a device and a method for automatic color calibration in a laser scanning apparatus, and in particular, in a laser projection system.

BACKGROUND

Pico-projectors, also known as handheld projectors or mobile projectors or pocket projectors, include miniaturized hardware and associated software for projecting digital images onto a surface. A laser projection system may include a power source (e.g., a battery), a laser light source (e.g., three laser diodes for emitting red, green, and blue light, or RGB beams), and scanning mirrors.

In order to project a colored image, the system includes a digital-to-analog converter or DAC configured to convert a digital signal into an analog one and to drive the laser diodes through respective laser drivers. Mirrors deflect light beams emitted by the laser diodes to a surface pixel-by-pixel, thereby displaying an image.

In order to operate properly, laser scanning projectors undergo a calibration. Such calibration is, e.g., performed to obtain a stable white balance and high resolution of color depth and is to be made during operation of the device. Laser power is a function of the operating temperature, which fluctuates according to the instantaneous laser transmission power.

Figure 1:
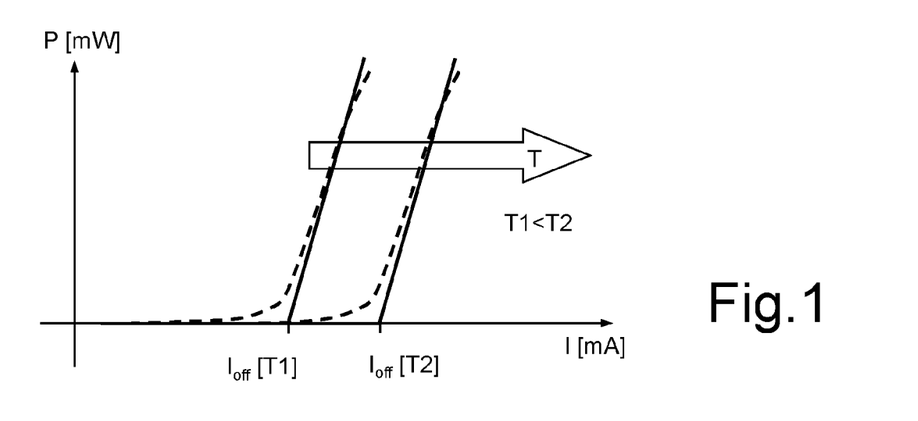
FIG. 1 shows a typical laser characteristics for monochromatic light and its dependence upon temperature.

In general, a laser diode is controlled by a current, as shown in FIG. 1 representing a typical laser characteristic for one color. In first approximation (continuous line), emitted power P is a straight, constant-slope line which is a function of current I, starting from a value (called offset current $I_{off}$). Offset current $I_{off}$ is a function of temperature (as indicated by an arrow). In general, the higher the temperature, the higher the driving current supplied the laser diodes to obtain a same power emitted by the laser diode. Dashed line show more accurate characteristics. The offset current $I_{off}$ is not exactly defined and the slope tends to deviate from an ideal line, especially at high driving currents.

Figure 2:
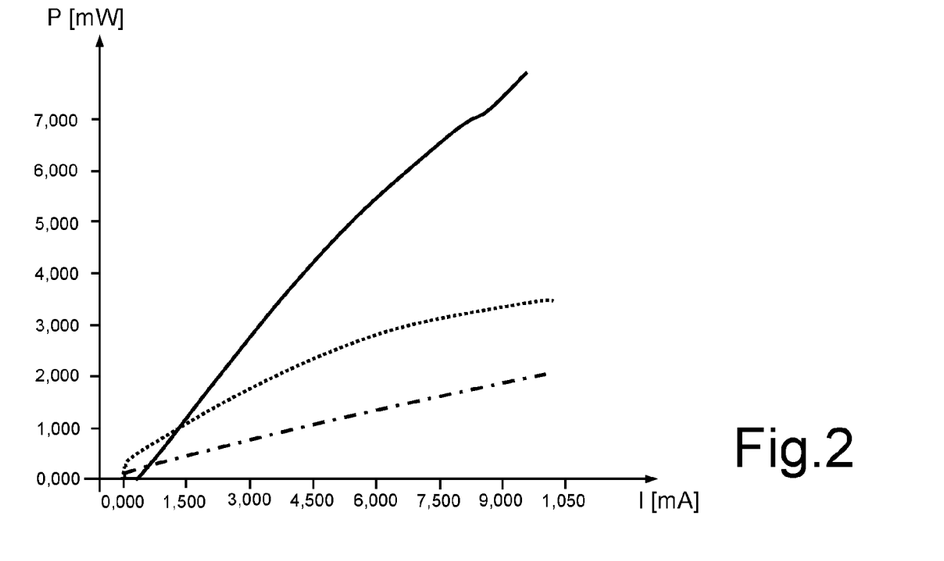
FIG. 2 shows typical commercial R, G and B lasers characteristics, wherein offset currents are subtracted.

FIG. 2 shows emitted power vs. current characteristics for typical commercial red laser diodes (with continuous line), green laser diodes (with dotted line) and blue laser diodes (with dash and dot line), wherein current I (on the X axis) is normalized and varies between 0 and 10. Current offset values are not shown in FIG. 2.

In general, the characteristics of FIGS. 1 and 2 also depend on a number of other parameters (such as ageing, manufacturing batches, and so on), so the number of parameters to be controlled depends on the desired accuracy.

Thus, calibration cannot be made once for all at a manufacturing stage, and a dynamic calibration is desired during use.

Laser calibration is usually done using photodiodes. Unlike laser diodes, photodiodes are relatively stable components that could be used to measure the amount of power emitted by the laser diodes. For examples, photodiodes may be arranged on a path of a portion of the emitted light so as to measure the correspondent emitted power value. The measured emitted power value may then be compared with the nominal power value. The thus obtained error may then be used for calibration.

Calibration may be made using a calibration photodiode for each laser diode. This uses three photodiodes which are isolated from each other and from external light, so as to operate properly. As a consequence, this involves high costs due to the need of the additional components and their packages; in addition it is very cumbersome. Therefore, this is not suitable for pico-projectors, wherein costs and dimensions are critical parameters.

An alternative, cheaper implementation is to have a single calibration photodiode that detects a mixture of the light emitted by each of the laser diodes. However, with this, since calibration is made during normal operation, the amount of the three RGB colors varies according to the projected image and the calibration photodiode provides a mixture power, whose composition is not exactly known. Thus, it is not a simple task to calibrate each monochromatic laser diode, in particular without interfering with the displayed image, as explained below.

Figure 3:
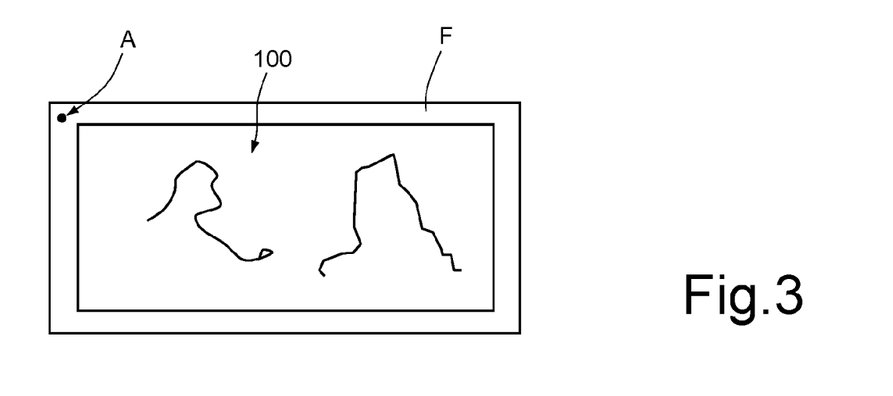
FIG. 3 is generic image wherein a calibration point is located outside the visible portion of an image.

The measure is generally made in suitable points of the image. For example, the measure may be made at special points purposely projected outside the image (see, e.g., point A in frame F outside image 100 in FIG. 3). However, it is complicated with current pico-projectors to hide the calibration points. In fact, a typical exit window of a typical pico-projector is of a range of 10 mm×7 mm, while the spot diameter at the exit is typically of a range of 1 mm. To block an entire spot it would be thus necessary to divert the ray at angles extremely over the usual operating angles. As a result, it is very difficult to hide such calibration points, without blocking the image, which is undesired.

SUMMARY

The above drawbacks are addressed by a dynamic calibration method for a pico-projector operating reliably without interfering with the image, described herein.

According to this disclosure, there are provided a color calibration device and a method of calibration of a laser scanning apparatus.

In an embodiment, a color calibration device for a laser scanning apparatus has a three-color laser source configured to emit a light beam and a compensation unit configured to electronically compensate positional errors of the three-color laser source. The color calibration device comprises: an emitted light detector configured to measure a power of the emitted light beam; a calibration unit coupled to the emitted light detector and having a controller configured to generate a quantity correction value; a laser source control element configured to generate a control quantity for the three-color laser source based on the quantity correction value; and a dominant color detector configured to detect a dominant color in the light beam being projected and cause the controller to adjust the quantity correction value for the dominant color.

In an embodiment, a method is presented for calibrating a laser scanning apparatus incorporating electronic compensation for positional errors of a three-color laser source, the three-color laser source configured to emit a light beam. The method comprises: measuring a power of the emitted light beam; generating a quantity correction value based on the measured power; controlling a quantity of the three-color laser source, based on the quantity correction value; and detecting a dominant color in the light beam being projected; wherein the quantity correction value is generated for the dominant color.

In an embodiment, an electronic device comprises: a three-color laser source configured to emit a light beam; a calibration unit having a controller configured to generate a quantity correction value; a laser source control element configured control the three-color laser source as a function of the quantity correction value; and a dominant color detector configured to detect a dominant color in the light beam being projected and cause the controller to adjust the quantity correction value for the dominant color.

BRIEF DESCRIPTION OF THE DRAWINGS

For the understanding of this disclosure, embodiments are now described, purely as a non-limitative example, with reference to the enclosed drawings, wherein.

DETAILED DESCRIPTION

The present method is based on the search of points of the image that are substantially single-color spots (dominant color spots). In particular, to increase the likelihood of success and reduce the calibration time, the present method exploits of the fact that, in present pico-projectors, the position and arrangement of the laser diodes is not so accurate to ensure each of the three color beams to exactly hit at the same time the same location of the projected image (color spots exactly superposed both in space and time). In particular, the present method exploits the fact that electronic calibration of the position and arrangement of the laser diodes cause projections of a single color beam, at least in preset portions of the projected image.

Figure 4:
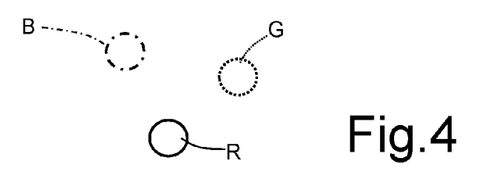
FIG. 4 shows the actual position of the color spots for a same point of an image being projected, which are slightly diverted due to position offset of the laser diodes.

In fact, during manufacturing, it is difficult to calibrate the three laser diodes so that the emitted spots hit all the same, exact location of a surface, as shown, e.g., for the pixel Pi in FIG. 4, wherein R is a red spot, G is a green spot and B is a blue spot.

As a matter of fact, minor offsets in the location of the emitted spots are generally in the range of a few pixels. In practice, these offsets may not be exactly integer numbers of pixels. The pico-projector may thus attribute the closest pixel to this offset or, preferably, make interpolations of neighbors to determine the value of the offset color. In the followings, offsets of integer pixels are considered for simplicity.

Figures 5, 5A:
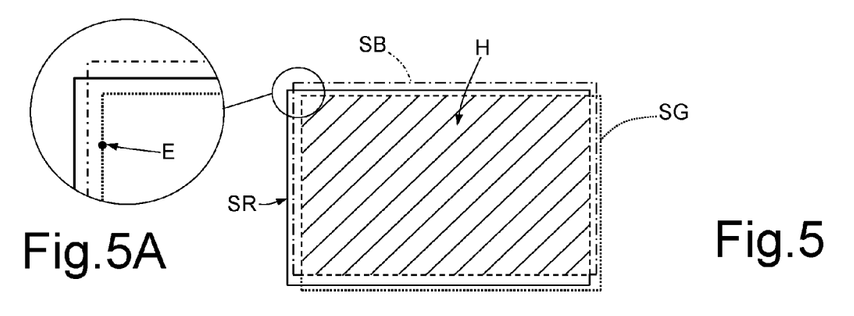
FIG. 5 is relative position of the RGB frames due to small misalignments in commonly available pico-projectors.
FIG. 5A is an enlarged detail of the RGB frames of FIG. 5.

Thus, the monochromatic screens SR, SG and SB (by this term, meaning the set of dots in each color that make a complete horizontal and vertical scan and whose superposition corresponds to the projected image) are generally offset to each other, as shown in FIG. 5.

In FIG. 5, the rectangle drawn with continuous line (indicated by SR) represents the perimeter of the red screen; the rectangle drawn with dotted line (indicated by SG) represents the perimeter of the green screen; and the rectangle drawn with dashed-and-dotted line (indicated by SB) represents the perimeter of the blue screen. Hatched intersection of rectangles SR, SG and SB is indicated by H.

To address the issue of the position offset, two approaches are possible.

One is to have a very precise calibration of the laser diode, so as to have offsets of the range of a fraction of a pixel.

Another is electronic correction. An electronic calibration system uses the image area H for display and provides for software pointers, one for each color, to cause the rows and columns of an image to be projected to match the desired position in the screen. In other words, if a positional error in a laser diode causes the relevant color spots to hit the location of previous pixels (delay-type position error), the electronic system may provide for emission of spots of this color in advance with respect to the other colors. In the alternative, if a positional offset in one or two laser diode(s) causes the relevant emitted spots to be positionally in advance with respect the desired location, their emission may be delayed with respect to the other color(s).

Although algorithmically complex, electronic calibration is more accurate and may dispense with exact matching of the three colors.

The present disclosure originates from the consideration that the above electronic compensation may be exploited to have a dynamic calibration of characteristics offset. In fact, electronic calibration of positional offset causes the spots at the edges of the image H not to be simultaneously projected for each color.

For example, in the offset condition shown in FIG. 5, as in the enlarged detail of FIG. 5A, at the left end of a horizontal sweep, at a certain time, the green laser diode emits light to hit point E.

Figure 6:
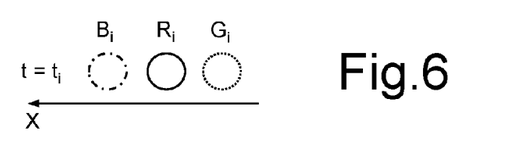
FIG. 6 shows the actual position of the color spots of a same pixel, due to position offset in a simplified condition.
Figure 7A:
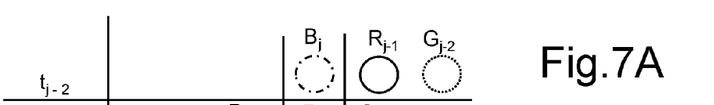
FIGS. 7A, 7B, 7C show the actual projected color spots for three subsequent pixels, in the simplified condition of FIG. 6.
Figure 7B:
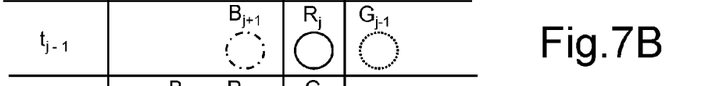
Figure 7C:
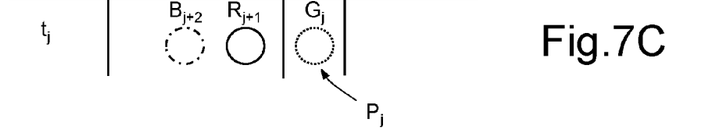
Figure 8A:
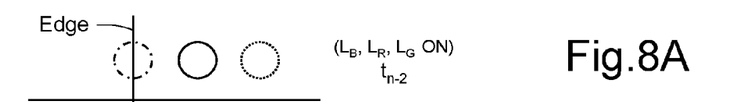
FIGS. 8A, 8B, 8C show the actual projected color spots for a same condition of FIGS. 7A-7C, in proximity of the edge of a projected image.
Figure 8B:
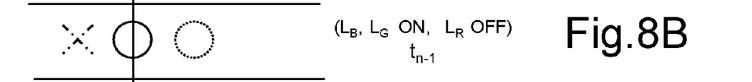
Figure 8C:
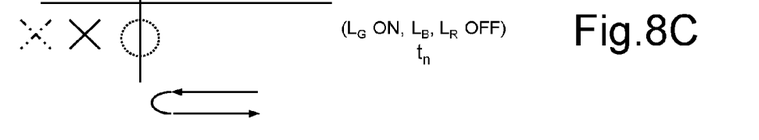

For a better understanding, reference is made to FIGS. 6-8, in the simplified hypothesis that position offset of the laser diodes is along the horizontal scanning line (identified in the figures as axis X) and that the mutual offset corresponds to one pixel. Under these conditions, without electronic calibration, at a time $t_i$, the three laser diodes would simultaneously emit, i.e., spots Bi, Ri and Gi as shown in FIG. 6.

In case of a positional error of the laser diodes, in order that, at a generic pixel j, the right R, G, B spots are emitted in the right place, the electronic calibration causes pixel components Rj, Bj and Gj to be emitted in different instants, e.g., instants tj, tj-1 and tj-2. The resulting emitted spots are shown in FIGS. 7A, 7B, 7C. As may be seen, in generic point Pj, the right superposition of colors, corresponding to desired pixel j, is obtained.

Since some color spots are emitted in advance to others, at the edges it may happen that some laser diodes do not emit light beams. This situation is shown, e.g. in FIGS. 8A, 8B and 8C, for the same simplified offset situation discussed above. In particular, in instant tn-2, spots Bn, Rn-1 and Gn-2 are emitted; in instant tn-1, spots Rn and Gn-1 are emitted (no blue beam is now emitted, since the last spot Bn for the blue color in the considered line had been already emitted— the corresponding blue laser diode is dimmed); and in instant tn, spot Gn is emitted (no blue and red beams are now emitted, since the last spots Bn and Rn have been already emitted (the corresponding blue and red laser diodes are dimmed).

In practice, at time tn, only green laser diode is active, while blue and red laser diodes are off.

Thus, by measuring the power emitted by the laser diodes in instant tn, the power emitted by the green laser diode may be measured.

Later, for a short period of time, three color spots are out of screen (not projected) and then they reverse direction and start moving toward the image H, as shown by the arrows in FIGS. 8A-8C. The green spot will be the first to be projected on the edge; thus it is possible to measure the power emitted by the relevant laser diode for anew calibration step. Note that in this opposite direction, the advanced and delayed spots are the opposite as above discussed.

Analogously, on other edges of the image, the red or the blue beam is emitted. For example, for image H in FIG. 5, at the bottom line blue beam (spot) may be measured and, on the right edge, the red beam (spot) may be measured.

Figure 9:
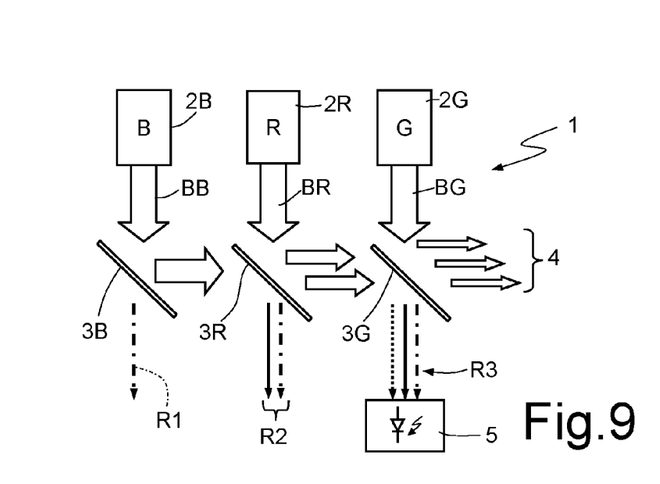
FIG. 9 is a block diagram of an exemplary laser projection system including emitted power detection.

Measure may be done as shown in FIG. 9, showing an exemplary three-color laser source 1. Laser source 1 comprises three laser elements 2B, 2R and 2G for blue, red and green colors, respectively, emitting light beams BB, BR and BG toward respective mirrors 3B, 3R and 3G. The mirrors 3B, 3R and 3G are arranged at 45° with respect to the relevant light beams BB, BR and BG and mutually aligned perpendicularly to the laser beams. A calibration photodiode 5 is arranged aligned with green laser element 2G and the emitted green light beam.

Mirrors 3R and 3G are dichroic mirrors, that reflect light coming from a first side thereof (that facing the respective laser element 2B, 2R and 2G) and allow passage of light coming from a second side thereof (in the specific embodiment, light coming from a previous mirror 3B and 3R, respectively), thereby providing at the output a combined three-color laser beam 4.

Since mirrors 3B, 3R and 3G are not ideal, when elements 2B, 2R and 2G are active, fractions of the respective emitted light beams BB, BR and BG are transmitted/reflected from the second side of the respective mirrors 3B, 3R, 3G, originating residual beams R1, R2 and R3, respectively, (including only blue color, blue and red colors and blue, red and green colors). According to a different embodiment, blue laser elements 2B may be arranged orthogonal to the red and green laser elements 2R, 2G, thereby dispensing with mirror 3B. In this case, no residual beam R1 is present.

Therefore, calibration photodiode 5 may measure the power of the residual beam R3. As indicated, in internal points of the image H, the mixture power of residual beam R3 is measured. However, at the edges of the image H, when a single laser element 2R, 2G and 2B is operating, as explained above with reference to FIGS. 6-8, the power emitted by the single active laser element 2R, 2G and 2B may be separately measured.

An implementation of an automatic calibration system exploiting the above calibration scheme is described hereinafter, with specific reference to calibration of current offset Ioff, as discussed with reference to FIG. 1. However, other parameters may be calibrated in a similar way.

Figure 10:
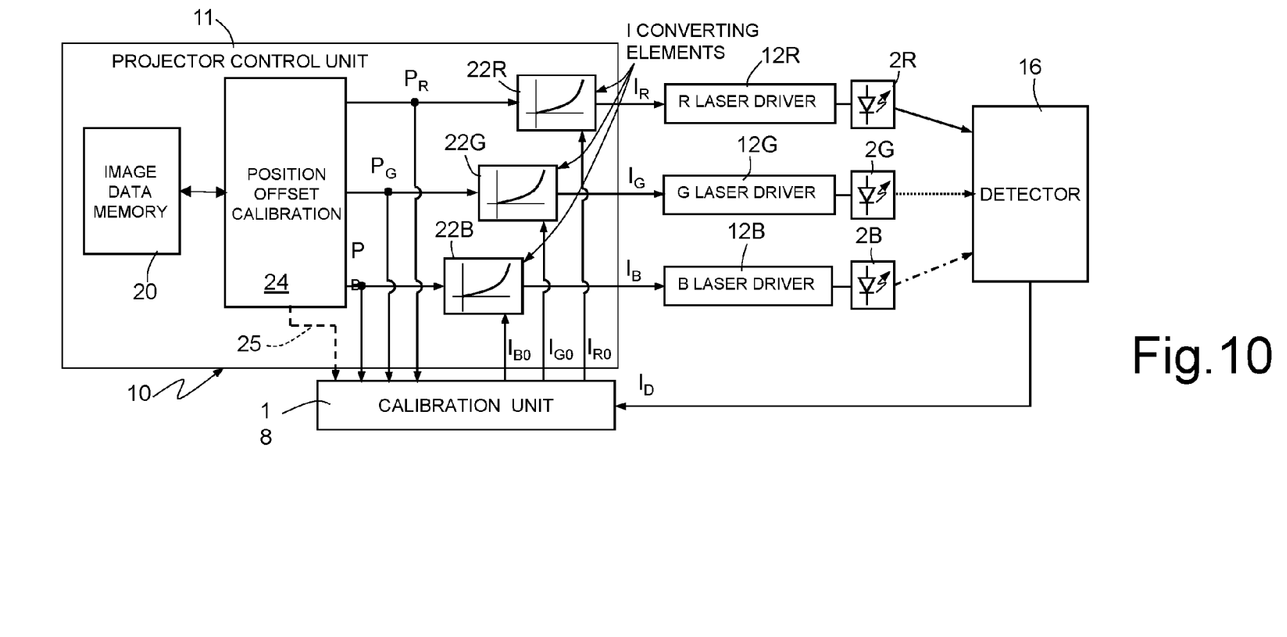
FIG. 10 is a simplified block diagram of an exemplary pico-projector including a calibration system.

FIG. 10 shows a block diagram of a pico-projector 10 having offset current Ioff calibration.

Pico-projector 10 comprise a projector control unit 11; laser driver units 12R, 12G, 12B; laser elements 2R, 2G and 2B; a power detector 16 and a calibration unit 18.

Projector control unit 11 is responsible for synchronizing the laser elements 2R, 2G, 2B and includes an image data memory 20 and current converting elements 22R, 22G and 22B, respectively for red, green and blue colors. Specifically, image data memory 20 stores the pixels of one or more images, e.g. of an image, ordered in rows and column, as three sets of nominal power values $P_R$, $P_G$, $P_B$. Nominal power values $P_R$, $P_G$, $P_B$ represent the power to be emitted by each laser element 2R, 2G, 2B to obtain a desired intensity of each color in a pixel to be projected and thus the desired combined color of the pixel. Nominal power values $P_R$, $P_G$, $P_B$ are fed to a position offset calibration unit 24 that causes advance/delay supply of each color screen from the data memory 20 to the current converting elements 22R, 22G and 22B, as above discussed. Position offset calibration unit 24 is known to the person skilled in the art and not discussed in detail here. For example, position offset calibration unit 24 may include three calculation machines, one for each color R G and B. Each calculation machine takes the values of its own color from the stored pixels and controls projection thereof, based on the correct parameters received from position offset calibration unit 24.

Current converting elements 22R, 22G and 22B are dynamically calibrated blocks that convert the received nominal power values $P_R$, $P_G$, $P_B$ to correspondent control currents values $I_R$, $I_G$, $I_B$. For example, current converting elements 22R, 22G and 22B may be tables storing the current I vs. power P characteristics of the laser elements 2R, 2G and 2B, wherein the values of offset current $I_{off}$ (see FIG. 1) may be calibrated based on the power error detected by the calibration unit 18, as discussed below. For example, calibration of the offset current $I_{off}$ may be simply made by correcting the control currents values $I_R$, $I_G$, $I_B$ read in the tables by the respective correction values fed by the calibration unit 18, e.g., by a simple shift operation.

Control current values $I_R$, $I_G$, $I_B$ generated by current converting elements 22R, 22G and 22B are fed to laser driver units 12R, 12G, 12B (which may include DACs) which, in turn, generate respective drive currents for the laser elements 2R, 2G and 2B.

Actual power emitted by laser elements 2R, 2G and 2B is detected by power detector 16, e.g., photodiode 5 of FIG. 9, outputting detector current $I_D$ in the way explained above.

Detector current $I_D$ is input to calibration unit 18 configured to compare a corresponding measured power with the nominal one, $P_R$, $P_G$, $P_B$, and to generate control signals $I_{R0}$, $I_{G0}$, $I_{B0}$ for the current converting elements 22R, 22G and 22B as disclosed hereinbelow with reference to FIGS. 11-15. Here, control signals $I_{RO}$, $I_{GO}$, $I_{BO}$ are used by current converting elements 22R, 22G and 22B to correct the offset current $I_{off}$.

Calibration unit 18 may operate in different ways.

In a first approach, calibration unit 18 may measure the power emitted just at the edges, based on the knowledge of what (single) color is being transmitted, e.g., by including a software check of the current pixel number being displayed.

A second approach comprises using a calibration table that stores the position of the pixels where each color may be corrected.

A third approach is based on the search of a dominant color in the whole image and correction of the relevant offset.

Figure 11:
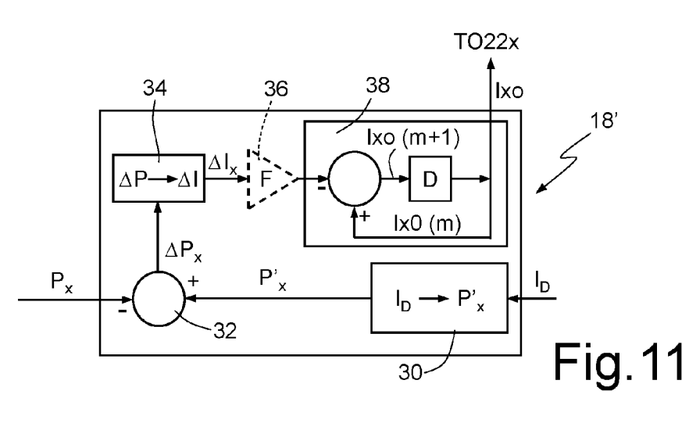
FIG. 11 is a simplified block diagram of a calibration unit for a single color beam.

In both first and second approaches, a calibration unit 18' may be implemented as shown in FIG. 11. Calibration unit 18' may be actuated by position offset calibration unit 24 (as represented by dashed line 25) based on knowledge of the single color being transmitted, according to the first approach, or the calibration table (not shown), according to the second approach.

In FIG. 11, calibration unit 18' receives detector current $I_D$ which is a function of the power emitted for a single color X and outputs a correction quantity, in the instant example a calibrated offset current Ixo, to the relevant current converting element 22X. A switch, not shown and e.g. controlled by position offset calibration unit 24, may couple, each time, the output of calibration unit 18' to the current converting element 22X corresponding to the measured single color.

Here, single color nominal power fed by position offset calibration 24 is indicated as Px and measured power corresponding to measured detector current $I_D$ is indicated by P'x.

Calibration unit 18' of FIG. 11 comprises a detector current-to-power-conversion element 30 receiving detector current $I_D$ from detector 16 and outputting the corresponding measured power P'x. Measured power P'x is compared with corresponding nominal power Px in error block 32; the resulting power error ΔPx is fed to a laser power-to-current conversion block 34 based on the slope of the laser characteristics (see, e.g., FIG. 1). For example, laser power-to-current conversion block 34 may be a table. Laser power-to-current conversion block 34 outputs a current error $\Delta I_X$. Current error $\Delta I_X$ may be attenuated in a factorizing block 36 and fed to a derivative-type controller 38 calculating the calibrated offset current Ixo. The calibrated offset current Ixo is then fed to the respective current converting element 22x that modifies the correspondent control currents values $I_R$, $I_G$, $I_B$, as above indicated.

Factorizing block 36 may be useful in case of high noise. In fact, the residual signal R3 is a mere fraction of the projected signal and there is inherent thermal noise in the detector 16. As a consequence, there may be a bell-shape Gaussian fluctuation around the nominal value. Therefore it is preferred to correct but a fraction of the current value. In this case, the calibration unit 18' of FIG. 11 provides a progressive correction that drives the controlled parameter (here the offset current Ixo) asymptotically to the desired value.

In the diagram of FIG. 11, since the slope of the laser characteristics may be approximated, after offset current Ixo, with a constant slope straight line, the laser power-to-current conversion block 34 may be replaced by a simple multiplying factor M, whereby current error becomes $\Delta I_X = M*\Delta P_X$.

Figure 12:
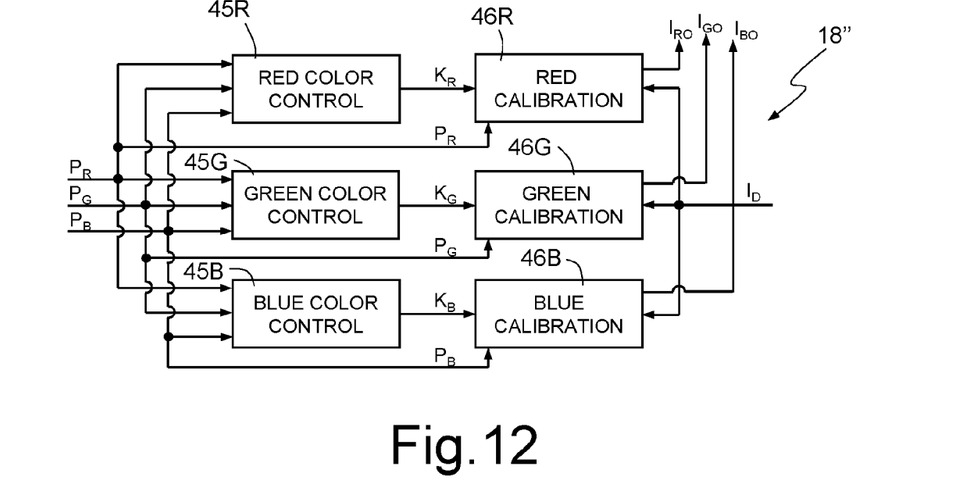
FIG. 12 is a simplified block diagram of a calibration unit for a three color beam.

In the above third approach, where each pixel in the image is checked and correction is made when a single or a dominant color is found, a calibration unit 18" may be implemented as shown in FIG. 12.

Calibration unit 18" of FIG. 12 comprises a color control block 45X and a color calibration module 46X for each of the single colors R, G and B, wherein X stands for R, G, B. In detail, for each generic color X, the relevant color block 45X receives nominal power values $P_R$, $P_G$, $P_B$ and generates a respective confidence factor $K_X$, indicative of the "amount" of the respective color X in the measured beam, e.g. in the residual beam R3 of FIG. 9. The confidence factors $K_X$ are then fed to the respective color calibration modules 46X, together with the relevant nominal power value Px and detector current $I_D$, to allow calculating a respective calibrated offset current IRo, IGo, IBo.

Figure 13:
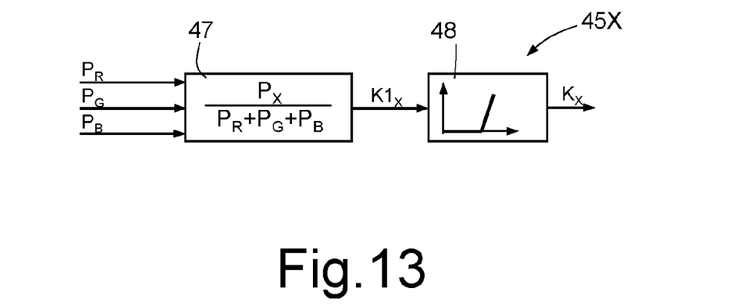
FIG. 13 is a block diagram of a part of the calibration unit of FIG. 12.

Each color control block 45X may be implemented as shown in FIG. 13. Here, color control block 45X comprises a divider 47X and a threshold unit 48X.

Divider 47X determines a relative power factor K1x as the ratio of the nominal power value Px of the considered color X and the power of colors ($P_R+P_G+P_B$), according to equation:

$$K_{1X} = \frac{P_X}{P_R + P_G + P_B}$$

wherein $P_R$, $P_G$, $P_B$ are received from projector control unit 11.

Figure 14:
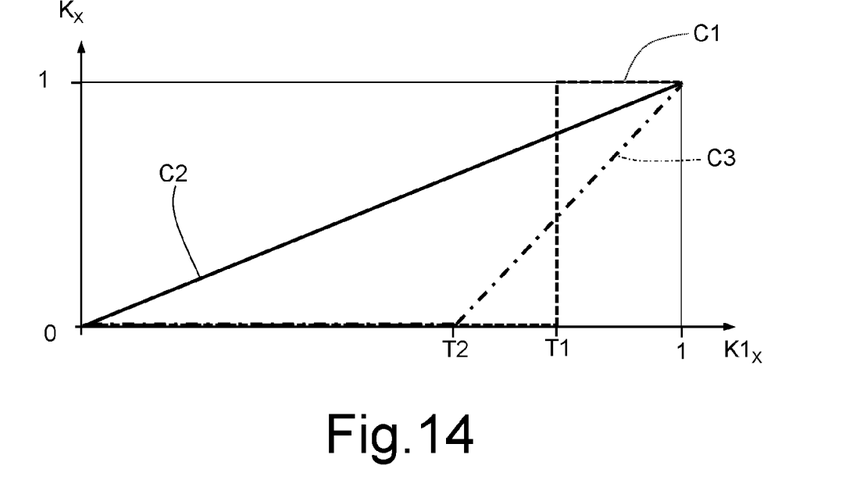
FIG. 14 is a plot of a thresholding operation performed by a block of the diagram of FIG. 13.

Relative power factor $K_{1x}$ is fed to threshold unit 48X that determines confidence factor $K_X$. Confidence factor $K_X$ may be a simple on-off value or have a variable value. For example, FIG. 14 shows three different curves of confidence factor $K_X$ as a function of relative power factor $K_{1x}$:

an on-off curve C1, wherein confidence factor $K_X$ is equal to 0 before a first threshold value T1 of the relative power factor K1x, intermediate between 0 and 1, and equal to 1 after first threshold value T1;

a straight curve C2, where confidence factor $K_X$ depends linearly upon relative power factor K1x; and a two-portion curve C3, where confidence factor $K_X$ is equal to 0 before a second threshold value T2 of the relative power factor K1x and depends linearly upon relative power factor K1x after second threshold value T1.

With curves C2 and C3, confidence factor $K_X$ may be 0 most of the time, and have a value greater than zero after the relevant thresholds T1, T2, that is only when the respective color passes a desired preset relative power amount. In this situation, the relevant color may be defined "dominant". This situation exist, e.g., at the edges, as previously discussed with reference to FIGS. 8A-8C.

Figure 15:
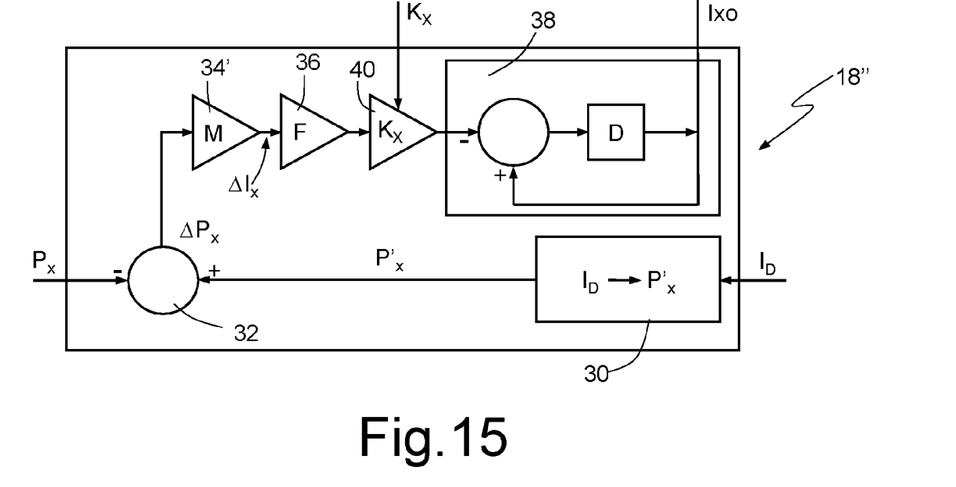
FIG. 15 is a block diagram of another part of the calibration unit of FIG. 12.

Each color calibration module 46X may be implemented as shown in FIG. 15.

Calibration unit 18" operates on a generic color X and on the basis of the value of relevant confidence factor $K_X$, as calculated by the relevant color control block 45X. Accordingly, in each module 46X, a multiplication block 40 is arranged between factorizing block 36 and derivative-type controller 38 and generates a filtered current error $\Delta I'_X$. For the rest, generic color calibration module 46X is similar to calibration unit 18' of FIG. 11 (wherein laser power-to-current conversion block 34 has been replaced by multiplying factor M, wherein M=ΔI/ΔP).

As indicated, confidence factor $K_X$ is related to the "amount" of the specified color in the measured beam, e.g.

in the residual beam R3 of FIG. 9. For example, in case of the on-off curve C1 of FIG. 14, if the considered color X is comprised with a sufficient (high) amount in the residual beam R3, $K_X=1$ and calibration unit 18" operates exactly as calibration unit 18' of FIG. 11. If the specific color X is not present in the residual beam R3 or its power amount is negligible, $K_X=0$, to prevent a noisy updating of the specified color.

Each generic color calibration module 46X is independent from the other color calibration modules 46X. Thus, no update, a single update or multiple updates of the calibrated offset current Ixo may occur per each pixel.

The embodiment of FIGS. 12-15 represent thus a simple algorithm that tests the existence (or the dominance) of a single color anywhere in the image and is able to correct the color accordingly. This algorithm is surely and automatically effective at the edges since here a single color is dominant (present), but may also work at the center of the image, if the latter includes a few pixels having a single or a dominant color.

Simulations have shown that the contribution to the offset current updating of the center of the image is poor relative to the edges, yet it provides additional improvement. Thus, since all techniques are statistical in nature, checking the overall image regardless of position of the specific pixel may be advantageous.

Figure 16:
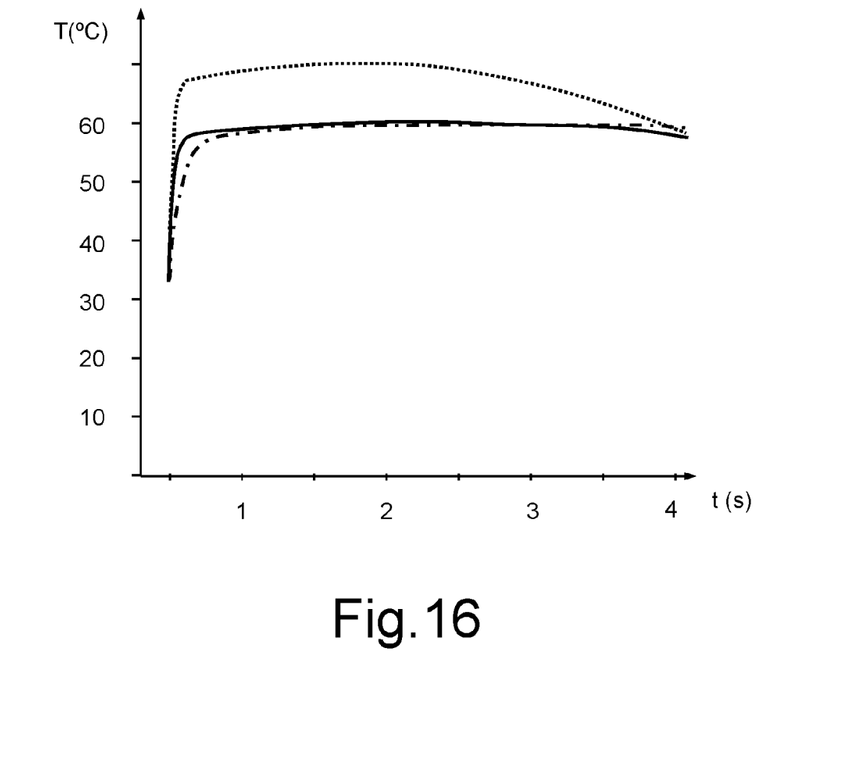
FIG. 16 shows a convergence plot for RGB colors with the present method.

The overall algorithm shows very good convergence, as shown in FIG. 16 for each of the three colors.

Finally, it is clear that numerous variations and modifications may be made to the described and illustrated herein, all falling within the scope of the invention as defined in the attached claims.

For example, the various embodiments described above can be combined to provide further embodiments.

For example, detection of the power actually emitted by laser elements 2B, 2G and 2G may be carried out in a different way, e.g. through additional mirrors intercepting part of the emitted beams BB, BR and BG.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A color calibration device for a laser scanning apparatus having a three-color laser source configured to emit a light beam and a compensation unit configured to electronically compensate positional errors of the three-color laser source, the color calibration device comprising:
an emitted light detector configured to measure a power of the emitted light beam;
a calibration unit coupled to the emitted light detector and having a controller configured to generate a quantity correction value, wherein the calibration unit comprises, for each color of the light beam being projected, a confidence value detector configured to generate a color confidence value,
a laser source control element configured to generate a control quantity for the three-color laser source based on the quantity correction value; and
a dominant color detector configured to detect a dominant color in the light beam being projected and cause the controller to adjust the quantity correction value for the dominant color, wherein the dominant color detector detects the dominant color as a function of which color has its color confidence value greater than a threshold while other colors have their color confidence value indicating substantially no presence of that color.

2. The color calibration device according to claim 1, wherein the light beam is projected according to frames having edges, the dominant color detector configured to cause the controller to adjust the quantity correction value in response to detection of a dominant color at a point on the frame edges.

3. The color calibration device according to claim 2, wherein the calibration unit further comprises:
an error unit configured to compare the measured power with a nominal power and generate a power error quantity; and
a converter configured to convert the power error quantity into a control quantity error;
wherein the controller is of an iterative type and is coupled to the converter to receive the control quantity error.

4. The color calibration device according to claim 1, wherein the calibration unit comprises, for each color of the light beam being projected, a calibration module configured to generate a respective quantity correction value based on the measured power for the considered color and the respective color confidence value.

5. The color calibration device according to claim 4, wherein, for each color in the light beam being projected, the respective confidence value detector comprises a relative power unit detector configured to calculate a color relative power as a ratio between a nominal power of the considered color and the measured power according to an equation:

$$K_{1X} = \frac{P_X}{P_R + P_G + P_B}$$

wherein $K_{1x}$ is the color relative power, $P_x$ is the nominal power of the considered color, and $(P_R+P_G+P_B)$ is a total nominal power of the light beam being projected.

6. The color calibration device according to claim 5, wherein each confidence value detector further comprises a threshold unit configured to compare the color relative power with a threshold value and generate the respective color confidence value.

7. The color calibration device according to claim 4, wherein each calibration module comprises:
an error unit configured to compare the measured power with a nominal power and generate a power error quantity;
a converter coupled to the error unit and configured to convert the power error quantity into a control quantity error;
a multiplier coupled to the converter and the confidence value detector and configured to generate a filtered control quantity error; and
wherein the controller is of an iterative type, coupled to the converter to receive the filtered control quantity error, and configured to generate the respective quantity correction value.

8. The color calibration device according claim 1:
wherein the emitted light detector is a photodiode;

wherein the three-color laser source comprises first, second and third laser elements emitting respective first, second and third monochromatic light beams, and first, second and third mirrors;

wherein the second mirror is a dichroic mirror arranged on a path of the second monochromatic light beam and on a path of the first light beam and configured to generate a second reflected beam;

wherein the third mirror is a dichroic mirror arranged on a path of the third monochromatic light beam and on a path of the second reflected light beam and configured to generate the emitted light beam on a first side thereof and a residual light beam on a second side thereof;

wherein the photodiode is arranged on a path of the residual light beam.

9. The color calibration device according to claim 1, wherein the quantity correction value is an offset current for each color of the three-color laser source.

10. A method for calibrating a laser scanning apparatus incorporating electronic compensation for positional errors of a three-color laser source, the three-color laser source configured to emit a light beam, the method comprising:
measuring a power of the emitted light beam;
generating a quantity correction value based on the measured power;
controlling a quantity of the three-color laser source, based on the quantity correction value;
detecting a dominant color in the light beam being projected by determining a color confidence value for each color in the light beam, and determining which color is dominant as a function of which color has its color confidence value greater than a threshold while other colors have their color confidence values indicating substantially no presence of that color; and
wherein the quantity correction value is generated for the dominant color.

11. The method according to claim 10, wherein the light beam is projected according to frames having edges, and wherein controlling the quantity comprises controlling the quantity in response to detection of the dominant color at a point on the frame edges.

12. The method according to claim 10, wherein the quantity correction value is based on the measured power value for the considered color and the respective color confidence value.

13. The method according to claim 12, wherein for each color in the light beam being projected, detecting a color confidence value comprises detecting a color relative power as a ratio between a nominal power value of the considered color and the measured powers according to equation:

$$K_{1x} = \frac{P_X}{P_R + P_G + P_B}$$

wherein $K_{1x}$ is the color relative power, wherein $P_x$ is the nominal power of the considered color, and ($P_R+P_G+P_B$) is a total nominal power of the light beam being projected.

14. The method according to claim 13, wherein detecting a color confidence value further comprises:
comparing the color relative power with a threshold value, and
generating the respective color confidence value.

15. The method according to claim 12, wherein generating a quantity correction value comprises:
comparing the measured power with a nominal power and generating a power error quantity;
converting the power error quantity into a control quantity error; and
iteratively generating the quantity correction value based on the control quantity error.

16. The method according to claim 10, wherein the quantity correction value is an offset current for each color of the three-color laser source.

17. An electronic device, comprising:
a three-color laser source configured to emit a light beam;
a calibration unit having a controller configured to generate a quantity correction value, wherein the calibration unit comprises, for each color of the light beam being projected, a confidence value detector configured to generate a color confidence value,
a laser source control element configured control the three-color laser source as a function of the quantity correction value; and
a dominant color detector configured to detect a dominant color in the light beam being projected and cause the controller to adjust the quantity correction value for the dominant color, wherein the dominant color detector detects the dominant color as a function of which color has its color confidence value greater than a threshold while other colors have their color confidence value indicating substantially no presence of that color.

18. The electronic device according to claim 17, wherein the light beam is projected within frames having edges; and wherein the dominant color detector is configured to cause the controller to adjust the quantity correction value in response to detection of a dominant color at a point on the frame edges.

19. The electronic device according to claim 18, further comprising an emitted light detector configured to measure a power of the emitted light beam; and wherein the calibration unit further comprises:
an error unit configured to compare the measured power with a nominal power and generate a power error quantity based thereupon; and
a converter configured to convert the power error quantity into a control quantity error;
wherein the controller is coupled to the converter to receive the control quantity error and is configured to adjust the quantity correction value based thereupon.

20. The electronic device according to claim 17, further comprising an emitted light detector configured to measure a power of the emitted light beam; and wherein the calibration unit comprises, for each color of the light beam being projected, a calibration module configured to generate a respective quantity correction value based on the measured power for the considered color and the respective color confidence value.

* * * * *